United States Patent
Iizumi et al.

(10) Patent No.: US 12,410,862 B2
(45) Date of Patent: Sep. 9, 2025

(54) CONTROL METHOD FOR VEHICLE AND CONTROL DEVICE FOR VEHICLE

(71) Applicant: NISSAN MOTOR CO., LTD., Yokohama (JP)

(72) Inventors: Takehiro Iizumi, Kanagawa (JP); Takahide Matsui, Kanagawa (JP); Hisahiro Nabeshima, Kanagawa (JP); Kenji Koshiba, Kanagawa (JP); Masayoshi Yoshino, Kanagawa (JP); Masahiro Tannai, Kanagawa (JP); Takuya Takamura, Kanagawa (JP); Naoyuki Tanaka, Kanagawa (JP); Moemi Samata, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/853,939

(22) PCT Filed: Apr. 7, 2022

(86) PCT No.: PCT/JP2022/017286
§ 371 (c)(1),
(2) Date: Oct. 3, 2024

(87) PCT Pub. No.: WO2023/195136
PCT Pub. Date: Oct. 12, 2023

(65) Prior Publication Data
US 2025/0230870 A1   Jul. 17, 2025

(51) Int. Cl.
*F16H 61/18* (2006.01)
*F16H 59/12* (2006.01)

(52) U.S. Cl.
CPC .............. *F16H 59/12* (2013.01); *F16H 61/18* (2013.01)

(58) Field of Classification Search
CPC ........... F16H 59/12; F16H 61/16; F16H 61/18
See application file for complete search history.

(56) References Cited

U.S. PATENT DOCUMENTS 2,610,518 A * 9/1952 Goedeke ................. F16H 59/12
74/483 PB

FOREIGN PATENT DOCUMENTS

| JP | S60-167843 A | 8/1985 | |
| JP | H02-017265 A | 1/1990 | |
| JP | 2006069368 A * | 3/2006 | ............. F16H 59/10 |
| JP | 2016-113071 A | 6/2016 | |
| WO | WO-2012176316 A1 * | 12/2012 | ............. B60K 20/02 |

* cited by examiner

*Primary Examiner* — Edwin A Young
(74) *Attorney, Agent, or Firm* — Foley & Lardner LLP

(57) ABSTRACT

A vehicle selects a parking position when a state in which a P range button (2) is operated overlaps a state in which an N range button (4) is operated. Thereafter, the vehicle maintains the parking position when the operation of P range button (2) is released and switched to the state in which N range button (4) is operated. This allows the vehicle to suppress the selection of a shift position that is different from the intention of the driver.

5 Claims, 5 Drawing Sheets

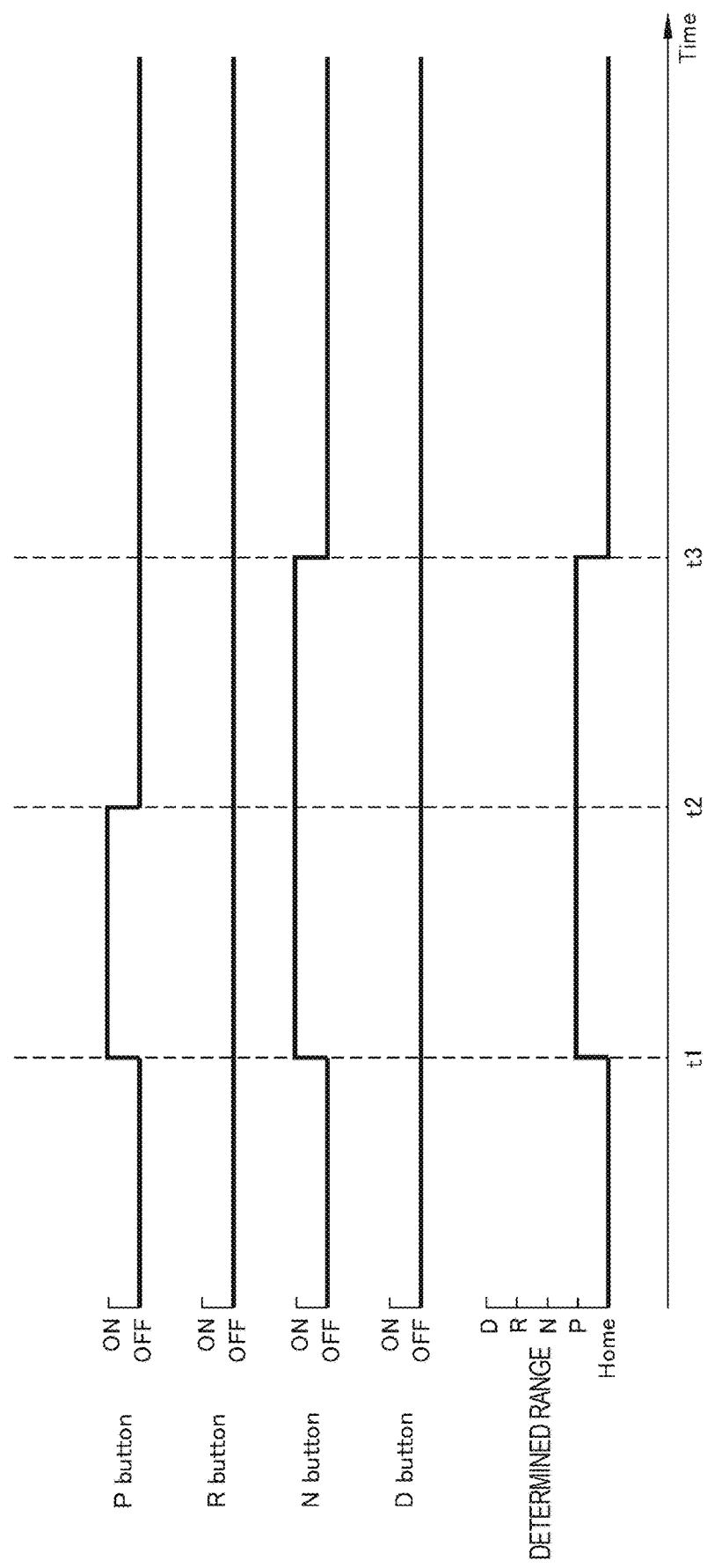

CONTROL METHOD FOR VEHICLE AND CONTROL DEVICE FOR VEHICLE

TECHNICAL FIELD

The present invention relates to a control method for a vehicle and a control device for the vehicle in which a shift position is selected by operating a switch.

BACKGROUND TECHNOLOGY

Heretofore, there has been known a shift device for a vehicle in which a shift position of the vehicle is selected by switch operation. In the shift device for selecting a shift position by the switch operation, it is necessary to determine which switch is operated in case where a plurality of switches are simultaneously operated, in consideration of safety.

For example, in a patent document 1, there is disclosed a technique in which when a plurality of push buttons including a push button for selecting a neutral position are simultaneously pushed, in order to avoid danger in driving operation, it is determined that the neutral position is selected.

In patent documents 2 and 3, there is disclosed a technique in which when a plurality of switches are simultaneously operated including the switch operation for selecting a parking position, in order to avoid danger in driving operation, it is determined that the parking position is selected.

However, for example, when, although a driver wants to originally select a parking position, the parking position and a neutral position are selected by mistake, following which when the neutral position is further selected, a shift device is controlled to select a shift position that is different from the intention of the driver.

That is, in addition to safety, there is room for improvement on performing efficient control when a plurality of switches are simultaneously operated.

PRIOR ART REFERENCE(S)

Patent Document(s)

Patent Document 1: Japanese Patent Application Publication No. H02-17265
Patent Document 2: Japanese Patent Application Publication No. 2016-113071
Patent Document 3: Japanese Utility Model Application No. S60-167843

SUMMARY OF THE INVENTION

A vehicle of the present invention selects a parking position when a state in which a switch for the parking position that is a shift position in which the power of a drive source is not transmitted to a drive wheel is operated overlaps a state in which a switch for a neutral position that is a shift position in which the power of the drive source is not transmitted to the drive wheel is operated, following which when the operation of the switch for the parking position is released and switched to the state in which the switch for the neutral position is operated, the parking position is maintained.

According to the present invention, it is possible to suppress the selection of a shift range that is different from the intention of the driver.

BRIEF DESCRIPTION OF THE DRAWINGS

FIG. 5 is a timing chart showing the relation between button operation of the shift operation device and a shift position selected by the button operation.

MODE FOR IMPLEMENTING THE INVENTION

In the following, one embodiment of the present invention will be explained in detail based on the drawings.

Figure 1:
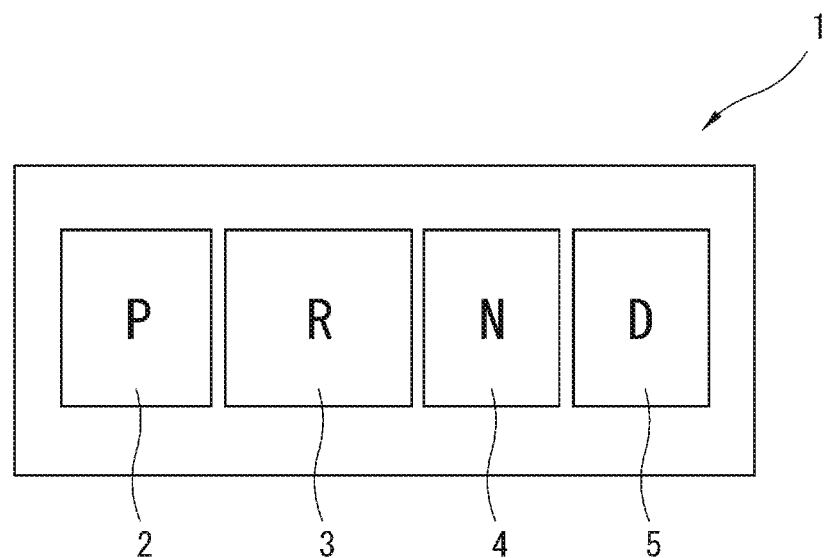
FIG. 1 is an illustrative view schematically showing a shift operation device of a vehicle.

FIG. 1 is an illustrative view schematically showing a shift operation device 1 of a vehicle to which the present invention is applied.

Shift operation device 1 includes an input part (switch) of a push-button switch, a touch panel or the like, and is one in which a driver operates (pushes, touches) the input part with, for example, a finger to select a shift position (shift range). Shift operation device 1 corresponds to a shift operation part, and is provided with the same number of push-button switches corresponding to shift positions one to one as that of selectable shift positions. For example, shift operation device 1 includes a P range button (P button) 2, an R range button (R button) 3, an N range button (N button) 4 and a D range button (D button) 5 as push-button switches.

P range button 2 corresponds to a parking position in which the power of a drive source is not transmitted to a drive wheel and is operated (pushed) to select the parking position. R range button 3 corresponds to a reverse position for moving backward in which the power of the drive source is transmitted to the drive wheel and is operated (pushed) to select the reverse position. N range button 4 corresponds to a neutral position in which the power of the drive source is not transmitted to the drive wheel and is operated (pushed) to select the neutral position. D range button 5 corresponds to a drive position for moving forward in which the power of the drive source is transmitted to the drive wheel and is operated (pushed) to select the drive position.

In addition, the order of the push buttons in shift operation device 1 is not limited to the order shown in FIG. 1 (in the order of P, R, N and D from the right side in FIG. 1) and can be appropriately changed.

Figure 2:
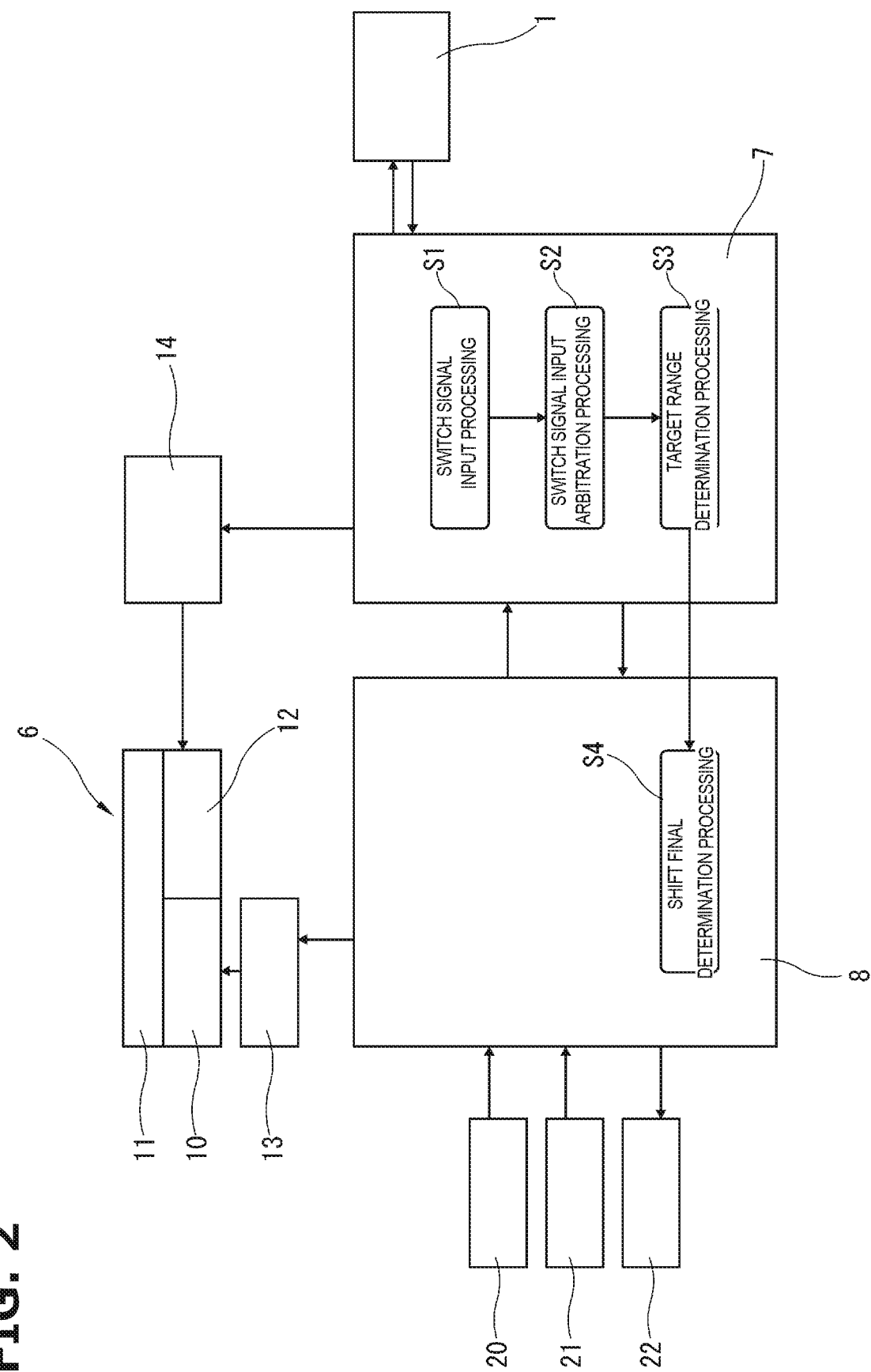
FIG. 2 is an illustrative view schematically showing a system configuration of the vehicle to which the present invention is applied.

FIG. 2 is an illustrative view schematically showing a system configuration of the vehicle to which the present invention is applied. In FIG. 2, there is shown a case where the vehicle to which the present invention is applied is a hybrid vehicle.

The vehicle includes, in addition to shift operation device 1, a driving unit 6, a shift controller 7 and a vehicle controller 8.

Driving unit 6 includes a motor 10 for traveling as a drive source for driving a drive wheel of the vehicle, a speed reduction device 11 for decelerating the rotation of traveling motor 10, and a parking lock mechanism 12 for mechanically locking the rotation of speed reduction device 11.

Traveling motor 10 is a direct drive source of the vehicle, and alternating current is supplied thereto, for example, from a battery (not shown) via an inverter 13. For example, traveling motor 10 is a synchronous motor using a permanent magnet to a rotor. In addition, traveling motor 10 functions as a generator at the time of the deceleration of the vehicle. That is, traveling motor 10 is a generator motor capable of charging regenerative energy to the battery, as electric power, which is generated at the time of the deceleration of the vehicle.

Speed reduction device 11 is one for ensuring traveling drive torque by decelerating the rotation of traveling motor 10 by the meshing of a plurality of gears so as to increase motor torque.

Parking lock mechanism 12 switches between a parking lock state in which the rotation of a gear inside speed reduction device 11 is locked and a parking lock release state in which the rotation of a gear inside speed reduction device 11 is allowed. Parking lock mechanism 12 is configured to switch between the parking lock state and the parking lock release state by the mechanical action in which a parking lock actuator is operated. For example, the mechanical action is one to prevent the gear from rotating when a claw-shaped member is caught in the gear of speed reduction device 11 by performing the advancing and retreating of the claw-shaped member.

An operation result of shift operation device 1 is input to shift controller 7. For example, in the push-button switch of the embodiment, when it is operated (pushed), a signal indicating the corresponding shift position is output, and when the operation is released (pushed state is returned to the original state), the output is stopped. Engine controller 7 performs, based on the input from shift operation device 1, a switch signal input processing S1, a switch signal input arbitration processing S2 and a target range determination processing S3 in order, and then selects a shift position.

When a plurality of switches of shift operation device 1 are pushed so as to overlap each other, shift controller 7 gives the highest priority to the operation of P range button 2, and then gives priority to the operation of N range button 4. In addition, shift controller 7 basically performs the button operation such that the operation of D range button 5 and the operation of R range button 3 do not take priority over the operation of P range button 2 and the operation of N range button 4. That is, the priority of the button operation is basically set to P>N>D=R. In other words, in the priority of the button operation, the priority of the operation of the switch for the shift position in which the power is transmitted to a drive wheel is lower than that of the operation of the switch for the shift position in which the power is not transmitted to a drive wheel.

In switch signal input processing S1, the signal from the switch operated in shift operation device 1 is processed. In switch signal input processing S1, a fault signal of shift operation device 1 is also processed.

In switch signal input arbitration processing S2, it is determined which push-button switch of shift operation device 1 is operated with respect to the input from shift operation device 1. Specifically, it is determined which switch is operated when, for example, a plurality of switches of shift operation device 1 are pushed to overlap each other.

In target range determination processing S3, it is determined which shift position (shift range) to actually switch to. The determination result in target range determination processing S3 is sent to vehicle controller 8.

Vehicle controller 8 performs a shift final determination processing S4 from the determination result of target range determination processing S3. In shift final determination processing S4, it is determined whether or not the determination result of target range determination processing S3 is acceptable on the vehicle side. For example, when the vehicle is in a state in which the determination result of target range determination processing S3 is not acceptable, the determination result of target range determination processing S3 is not accepted, and the present shift position is maintained. In addition, the result of shift final determination processing S4 is fed back to shift controller 7.

That is, shift controller 7 and vehicle controller 8 correspond to a control section, and are configured to determine which shift position is selected from the operation result of shift operation device 1 and control the vehicle based on the shift position which has been determined to be selected.

In addition, when a fault signal of shift operation device 1 is input to switch signal input processing S1, shift controller 7 does not perform the determination which button corresponding to which range in shift operation device 1 is pushed.

Shift controller 7 supplies a predetermined electric power to a parking lock actuator 14 such that parking lock actuator 14 can obtain a desired drive output, when the shift position is switched to P range based on the result of shift final determination processing S4 which has been fed back. Parking lock actuator 14 is one for operating parking lock mechanism 12.

Vehicle controller 8 inputs the result of shift final determination processing S4 to inverter 13. That is, as information, which vehicle shift position out of a parking position, a neutral position, a drive position and a reverse position has been selected is input to inverter 13.

Inverter 13 determines electric power to be supplied to traveling motor 10 based on the command from vehicle controller 8.

Charging/discharging information of a battery which is capable of supplying electric power to traveling motor 10 is input to vehicle controller 8 from a battery controller 20 which manages the charging/discharging of the battery. Control information of an internal combustion engine driven for generating electric power to be supplied to traveling motor 10 is input to vehicle controller 8 from an engine control unit 21 for controlling the internal combustion engine. The internal combustion engine is one for driving a generator which generates electric power to be supplied to the battery and the internal combustion engine.

In addition, vehicle controller 8 outputs the information of a shift position to a meter 22 for displaying the shift position.

Figure 3:
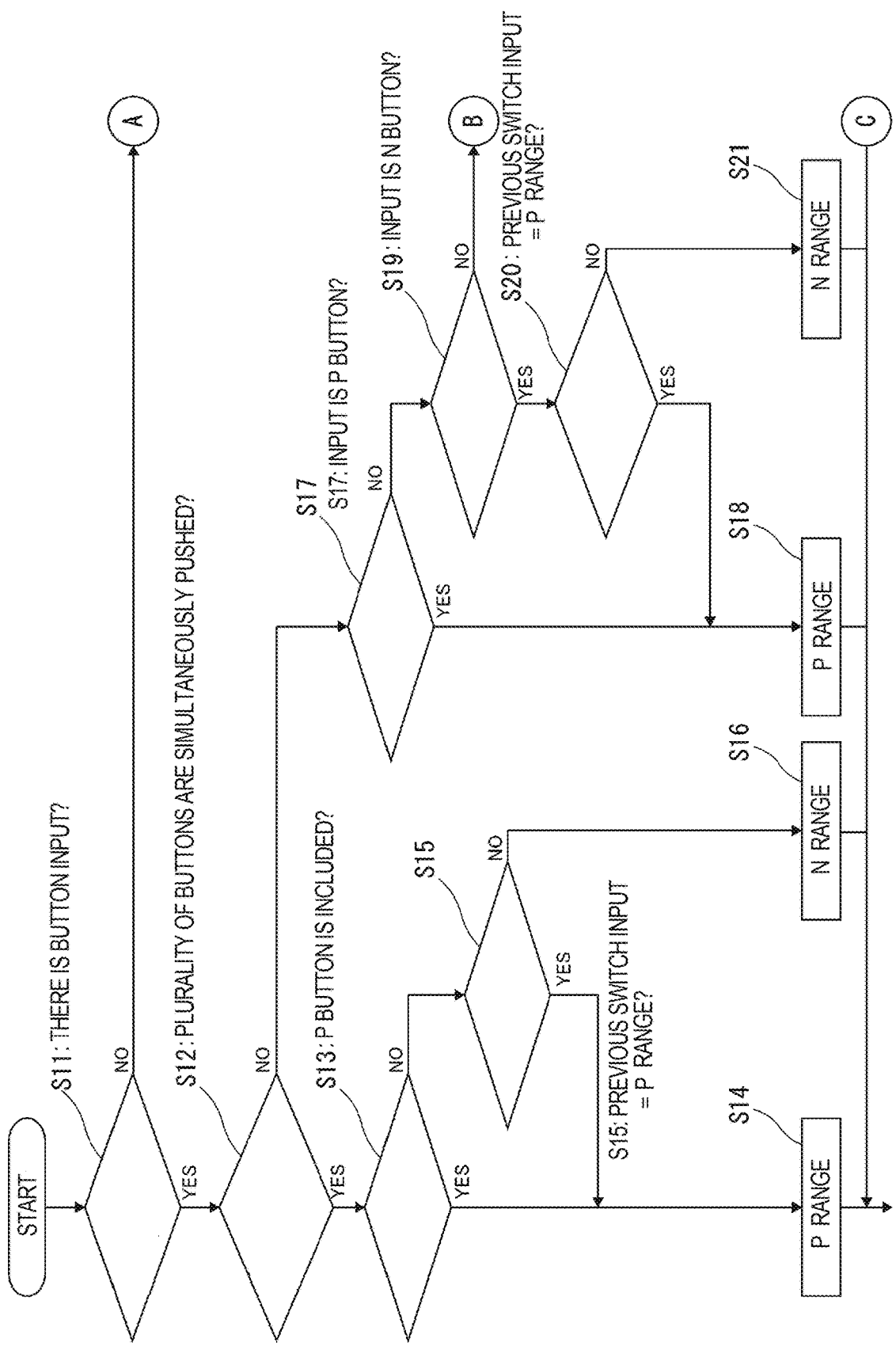
FIG. 3 is a flow chart showing a processing flow to determine a shift position.
Figure 4:
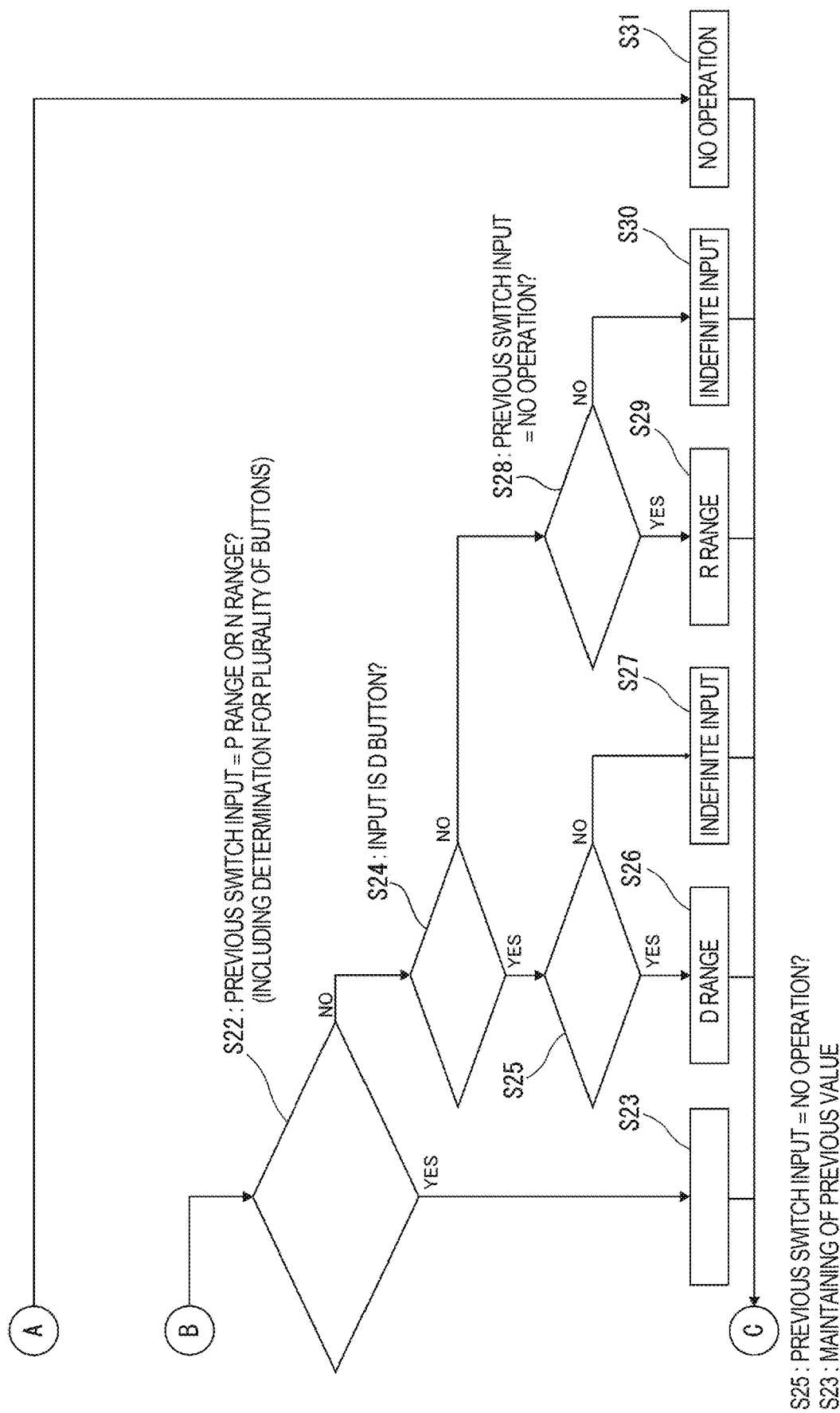
FIG. 4 is a flow chart showing a processing flow to determine a shift position.

FIGS. 3 and 4 each are a flow chart showing a processing flow to determine a shift position which is performed in switch signal input arbitration processing S2 of shift controller 7.

In a step S11, the presence of the button input of shift operation device 1 is determined. That is, in step S11, it is determined whether or not any one of the buttons of shift operation device 1 is operated (pushed). When it is determined that there is button input in step S11, the step proceeds to a step S12. When it is determined that there is no button input in step S11, the step proceeds to a step S31.

In step S12, it is determined whether or not a plurality of buttons of shift operation device 1 are simultaneously pushed. That is, in step S12, it is determined whether or not a plurality of buttons of shift operation device 1 are operated so as to overlap each other. When it is determined that the plurality of the buttons are simultaneously pushed in step S12, the step proceeds to a step S13. When it is determined that the plurality of the buttons are not simultaneously pushed in step S12, the step proceeds to a step S17.

In step S13, it is determined whether or not P range button 2 is included in the plurality of the buttons which have been operated. When it is determined that P range button 2 is included in step S13, the step proceeds to a step S14. When it is determined that P range button 2 is not included in step S13, the step proceeds to a step S15.

In step S14, it is determined that the parking position is selected as a shift position, and then the routine this time is ended.

In step S15, it is determined whether or not the previous switch input is performed by P range button 2. That is, in step S15, it is determined whether or not the shift position which has been determined last time is the parking position. When, it is determined that the shift position which has been determined last time is the parking position in step S15, the step proceeds to step S14. When, it is determined that the shift position which has been determined last time is not the parking position in step S15, the step proceeds to a step S16.

In step S16, it is determined that the neutral position is selected as a shift position, and then the routine this time is ended.

In step S17, it is determined whether or not the button input is performed by P range button 2. When it is determined that the button input is performed by P range button 2 in step S17, the step proceeds to a step S18. When it is determined that the button input is not performed by P range button 2 in step S17, the step proceeds to a step S19.

In step S18, it is determined that the parking position is selected as a shift position, and then the routine this time is ended.

In step S19, it is determined whether or not the button input is performed by N range button 4. When it is determined that the button input is performed by N range button 4 in step S19, the step proceeds to a step S20. When it is determined that the button input is not performed by N range button 4 in step S19, the step proceeds to a step S22.

In step S20, it is determined whether or not the previous switch input is performed by P range button 2. That is, in step S20, it is determined whether or not the shift position which has been determined last time is the parking position. When, it is determined that the shift position which has been determined last time is the parking position in step S20, the step proceeds to step S18. When, it is determined that the shift position which has been determined last time is not the parking position in step S20, the step proceeds to a step S21.

In step S21, it is determined that the neutral position is selected as a shift position, and then the routine this time is ended.

In step S22, it is determined whether or not the previous switch input is one including P range button 2 or N range button 4. That is, in step S22, it is determined whether the shift position which has been determined last time is the parking position or the neutral position. When it is determined that the shift position which has been determined last time is the parking position or the neutral position in step S22, the step proceeds to a step S23. When it is determined that the shift position which has been determined last time is not the parking position or the neutral position in step S22, the step proceeds to a step S24.

In addition, the previous switch input in step S22 includes a switch input corresponding to a shift position determined when a plurality of buttons of shift operation device 1 are simultaneously pushed. That is, when the previous shift position is a shift position which has been determined based on the result of the simultaneous pushing of the plurality of the buttons in shift operation device 1, the previous switch input in step S22 becomes one corresponding to the determined shift position.

In step S23, the previous value is held, and the routine this time is ended. That is, in step S23, the shift position selected last time is maintained, and the routine this time is ended.

In step S24, it is determined whether or not the button input is performed by D range button 5. When it is determined that the button input is performed by D range button 5 in step S24, the step proceeds to a step S25. When it is determined that the button input is not performed by D range button 5 in step S24, the step proceeds to a step S28.

In step S25, it is determined whether the previous switch input is no operation. That is, in step S25, it is determined whether or not the previous determination result is no operation. When it is determined that the previous determination is no operation in step S25, the step proceeds to a step S26. When it is determined that the previous determination is not no operation in step S25, the step proceeds to a step S27. In addition, as an example of a case to proceed to step S27, when the finishing (off) of the operation of R range button 3 and the operation (on) of D range button 5 are simultaneously performed, the step proceeds to step S27.

In step S26, it is determined that the drive position is selected as a shift position, and then the routine this time is ended.

In step S27, indefinite input is determined, and the routine this time is ended.

In step S28, it is determined whether or not the previous switch input is no operation. That is, in step S28, it is determined whether or not the previous determination result is no operation. When, it is determined that the previous determination is no operation in step S28, the step proceeds to a step S29. When it is determined that the previous determination is not no operation in step S28, the step proceeds to a step S30. In addition, as an example of a case to proceed to step S30, when the finishing (off) of the operation of D range button 5 and the operation (on) of R range button 3 are simultaneously performed, the step proceeds to step S30.

In step S29, it is determined that the reverse position is selected as a shift position, and then the routine this time is ended.

In step S30, indefinite input is determined, and then the routine this time is ended.

In step S31, no operation is determined, and the routine this time is ended. That is, in step S31, it is determined that any buttons of shift operation device 1 have not been operated.

FIG. 5 is a timing chart showing the relation between button operation of shift operation device 1 and a shift position (determined range) selected by the determination in switch signal input arbitration processing S2.

A time t1 is a timing at which P range button 2 and N range button 4 are operated (pushed) and are turned on. Shift controller 7 determines that P range button 2 is operated at time t1 (steps S11→S12→S13→S14 of the flow chart in FIG. 3), according to the priority of the button operation. Consequently, the determined range is a parking position from time t1.

A time t2 is a timing at which the operation of P range button 2 is finished (turned off). At this time, N range button 4 which has been simultaneously turned on with P range button 2 is maintained into an on-state. Consequently, shift controller 7 determines that a shift position is maintained in the parking position at time t2 (steps S11→S12→S17→S19→S20→S18 of the flow chart in FIG. 3). Therefore, the determined range is maintained in the parking position also after time t2.

A time t3 is a timing at which the operation of N range button 4 is finished (turned off). Shift controller 7 determines that there is no button input of shift operation device 1 at time t3 (steps S11→S31 of flow chart in FIGS. 3 and 4). Consequently, the determined range is a home position from time t3.

Shift controller 7 sets the determined range to the home position (Home) in a state (off state) in which all of the buttons of shift operation device 1 are not operated. In other words, the home position is a state in which shift positions such as the parking position, the neutral position, the drive position and the reverse position are not selected. In shift controller 7, when the determined range experiences the home position, it can be switched to a new determined range.

As explained above, in the vehicle to which the present invention has been applied, when a state in which P range button 2 is operated overlaps a state in which N range button 4 is operated, the parking position is selected, following which when the operation of P range button 2 is released and switched to a state in which N range button 4 is operated, the parking position is maintained.

That is, in the vehicle to which the present invention has been applied, when a state in which a switch for a parking position that is a shift position in which the power of a drive source is not transmitted to a drive wheel is operated overlaps a state in which a switch for a neutral position that is a shift position in which the power of the drive source is not transmitted to a drive wheel is operated, the parking position is selected, following which when the operation of the switch for the parking position is released and switched to a state in which only a switch for the neutral position is operated, the parking position is maintained.

Specifically, when after (immediately after) the routine leading to step S14, the routine leading to step S11, step S12, step S17, step S19, step S20 and step S18 is experienced, the parking position that is a previous value in which the power of the drive source is not transmitted to a drive wheel is maintained.

Accordingly, in the vehicle, the selection of a shift position (shift range) that is different from the intention of the driver can be suppressed.

As the above, although a specific embodiment of the present invention has been explained, the present invention is not limited to the above embodiment, and various changes might be made to the embodiment without departing from the scope and spirit of the present invention.

For example, shift controller 7 may be configured such that when P range button 2 and N range button 4 are operated (pushed) during traveling in a state in which the shift position is the drive position or reverse position, the traveling state is maintained. Specifically, shift controller 7 may be configured such that when P range button and N range button 4 are operated (pushed) at the time when the determined range is the reverse position by the operation (pushing) of R range button 3, and the operation of R range button 3 overlaps the operation of N range button 4, the determination of the reverse position is maintained.

With this determination, in the vehicle, it is possible to suppress a decrease in safety caused by a change in a shift position to one in which the power is not transmitted to a drive wheel during moving forward or backward.

In addition, the present invention can also be applied to a vehicle in which a drive wheel is driven by an internal combustion engine. In this case, driving unit 6 is composed of an internal combustion engine, a transmission and the like, and a transmission control unit performs processing from switch signal input processing S1 to shift final determination processing S4, and inverter 13 is omitted.

Moreover, in the embodiment mentioned above, shift controller 7 and vehicle controller 8 may be configured by one controller. In addition, shift operation device 1 may perform processing of switch signal input arbitration processing S2.

The embodiment mentioned above relates to a control method for a vehicle and a control device for the vehicle.

The invention claimed is:

1. A control method for a vehicle, wherein the vehicle comprises a shift operation part configured to indicate a shift position when operation of a switch corresponding to the shift position is performed, the method comprising:
   selecting a parking position when a state in which a switch for the parking position that is a shift position in which power of a drive source is not transmitted to a drive wheel is operated overlaps a state in which a switch for a neutral position that is a shift position in which the power of the drive source is not transmitted to the drive wheel is operated; and
   maintaining the parking position when the operation of the switch for the parking position is released and switched to the state in which the switch for the neutral position is operated, after the selection.

2. The control method for the vehicle according to claim 1, wherein characters indicating the corresponding shift positions are marked on the respective switches corresponding to the respective shift positions, and
   wherein the switches corresponding to the shift positions are disposed and arranged in a row in a horizontal direction of the characters marked on the switches.

3. The control method for the vehicle according to claim 2, wherein the switches corresponding to the shift positions each have a rectangular shape and are arranged adjacent to each other.

4. The control method for the vehicle according to claim 2, wherein the switches corresponding to the shift positions are a P range button corresponding to the parking position, an R range button corresponding to a reverse position, an N range button corresponding to the neutral position and a D range button corresponding to a drive position, and are disposed and arranged in an order of the P range button, the R range button, the N range button and the D range button.

5. A control device for a vehicle, comprising:
   a shift operation part configured to indicate a shift position when operation of a switch corresponding to the shift position is performed; and
   a control section configured to:
      select a parking position when a state in which a switch for the parking position that is a shift position in which power of a drive source is not transmitted to a drive wheel is operated overlaps a state in which a switch for a neutral position that is a shift position in which the power of the drive source is not transmitted to the drive wheel is operated; and
      maintain the parking position when the operation of the switch for the parking position is released and switched to the state in which the switch for the neutral position is operated, after the selection.

* * * * *